(12) United States Patent
McClenny et al.

(10) Patent No.: US 7,796,757 B2
(45) Date of Patent: Sep. 14, 2010

(54) METHODS AND SYSTEMS TO OPERATE A SET-TOP BOX

(75) Inventors: John McClenny, San Antonio, TX (US); Steven M. Wollmershauser, San Antonio, TX (US); Brian Wilson, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1055 days.

(21) Appl. No.: 11/373,810

(22) Filed: Mar. 9, 2006

(65) Prior Publication Data

US 2007/0214474 A1 Sep. 13, 2007

(51) Int. Cl.
*H04B 7/00* (2006.01)
(52) U.S. Cl. .......................... 380/239; 725/31; 725/80; 725/81; 725/110; 725/152; 725/132; 725/140; 380/242
(58) Field of Classification Search .................. None
See application file for complete search history.

(56) References Cited

U.S. PATENT DOCUMENTS

| | | | |
|---|---|---|---|
| 6,226,383 B1 * | 5/2001 | Jablon | 380/30 |
| 6,834,111 B1 | 12/2004 | Nishimura | |
| 6,920,614 B1 | 7/2005 | Schindler | |
| 2003/0139980 A1 * | 7/2003 | Hamilton | 705/27 |
| 2003/0179835 A1 | 9/2003 | Tsubouchi | |
| 2003/0179881 A1 | 9/2003 | Nicolas | |
| 2004/0060977 A1 * | 4/2004 | Proennecke | 235/375 |
| 2004/0117632 A1 * | 6/2004 | Arling et al. | 713/182 |
| 2004/0117650 A1 | 6/2004 | Karaoguz | |
| 2004/0122908 A1 | 6/2004 | Konopka | |
| 2004/0125077 A1 * | 7/2004 | Ashton | 345/156 |
| 2005/0097612 A1 | 5/2005 | Pearson | |
| 2005/0157215 A1 | 7/2005 | Minnick | |
| 2007/0025554 A1 * | 2/2007 | Ong | 380/278 |

\* cited by examiner

*Primary Examiner*—Taghi T Arani
*Assistant Examiner*—Amir Mehrmanesh
(74) *Attorney, Agent, or Firm*—Pablo Meles; Guntin Meles & Gust, PLC

(57) ABSTRACT

According to a first aspect there is provided systems and methods for receiving an encrypted signal from a portable communication device, the encrypted signal containing information associated with a command; and decrypting the encrypted signal to enable a set-top box to execute the command. According to a second aspect there is provided systems and methods for encrypting information to generate an encrypted signal, the information associated with a command entered via a control; and communicating the encrypted signal to the set-top box, the encrypted signal for decryption at the set-top box to enable execution of the command to operate the set-top box.

20 Claims, 7 Drawing Sheets

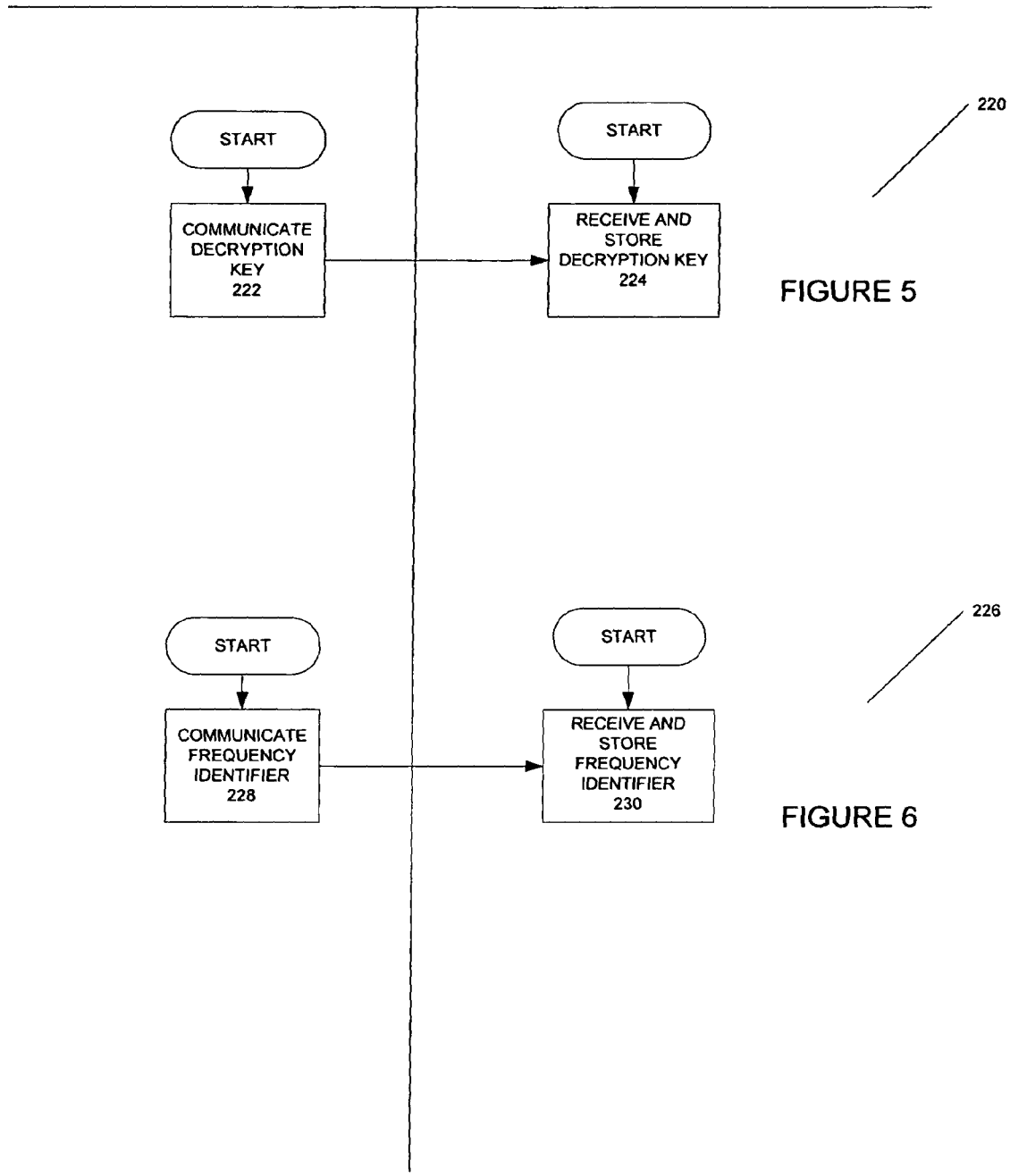

METHODS AND SYSTEMS TO OPERATE A SET-TOP BOX

FIELD

This application relates to electronic processing, and more specifically to methods and systems to operate a set-top box.

BACKGROUND

Set-top boxes are used in conjunction with television sets to provide advanced programming services, such as digital signal decoding, program guides, video-on-demand, and so on. Typically, the set-top box (STB) may be controlled with a remote control that is matched to the STB. For example, most remote controls that generate signals using ultra high frequency (UHF) and radio frequency (RF) technology also use a manual device identification code (MDIC) that corresponds to a MDIC in the set-top box to reduce possible interference from another remote control. In other words, a STB may receive a RF signal from multiple remote controls that operate within close proximity (e.g., an apartment house) and the STB should only respond to remote controls intended to control that STB. Further, the number of bits used to represent the MDIC may determine the number of unique MDICs that may be used to identify a remote control. For example, a small number of bits may increase the probability that a randomly generated MDIC may be duplicated in another remote control. If a small sized MDIC is used, the common technique may be to allow the setting of the MDIC in each remote. However, this technique may increase the complexity of installation and may still not avoid the duplication of MDICs. A larger number of bits may be used to provide for additional MDICs; however, this increases the total length of the signal communicated from the remote control to the set-top box. By regulation, the average RF power that may be emitted by a remote control is limited. Thus, the use of a larger number of bits has the disadvantage of requiring more power to communicate the signal which consequently reduces the range of the remote control.

BRIEF DESCRIPTION OF DRAWINGS

The present disclosure is illustrated by way of example and not limitation in the figures of the accompanying drawings, in which like references indicate similar elements and in which:

FIG. 5 is a flow chart illustrating a method, according to an embodiment of the present disclosure, to communicate a decryption key to a set-top box;

FIG. 6 is a flow chart illustrating a method, according to an embodiment of the present disclosure, to select a radio frequency;

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

According to a first aspect there is provided a method for operating a communication device (e.g., remote control). The method includes encrypting information to generate an encrypted signal, the information associated with a command entered with a control; and communicating the encrypted signal to the set-top box, the encrypted signal for decryption at the set-top box to enable execution of the command to operate the set-top box.

According to a second aspect there is provided a method to operate a set-top box. The method includes receiving an encrypted signal from a portable communication device, the encrypted signal containing information associated with a command; and decrypting the encrypted signal to enable the set-top box to execute the command.

Other features of the present disclosure will be apparent from the accompanying drawings and from the detailed description that follows.

In a particular embodiment, a user may operate a remote control to control a set-top box. For example, a user may select a sequence of keys on a remote control to generate information that includes a command (e.g., increment channel, volume up, etc.). The command information is processed by a verification module which receives the command information as input and generates output in the form of verification information (e.g., CRC checksum) that corresponds to the command information. Further, the remote control includes an encryption engine that uses an encryption key to encrypt the command information and the verification information into an encrypted signal that may be communicated to a set-top box. At the set-top box, a decryption engine receives the encrypted signal and utilizes a decryption key, which corresponds to the encryption key, to decrypt the encrypted signal. Further, the set-top box includes a verification module that receives the decrypted command information as input and generates output in the form of verification information (e.g., CRC checksum) that is compared with the verification information (e.g., CRC checksum) communicated from the remote control. If the verification information matches, then the set-top box executes the command. If the verification information does not match then the encrypted signal has not been decrypted with the correct decryption key signifying a command from a remote control that should not control the set-top box.

Figure 1:
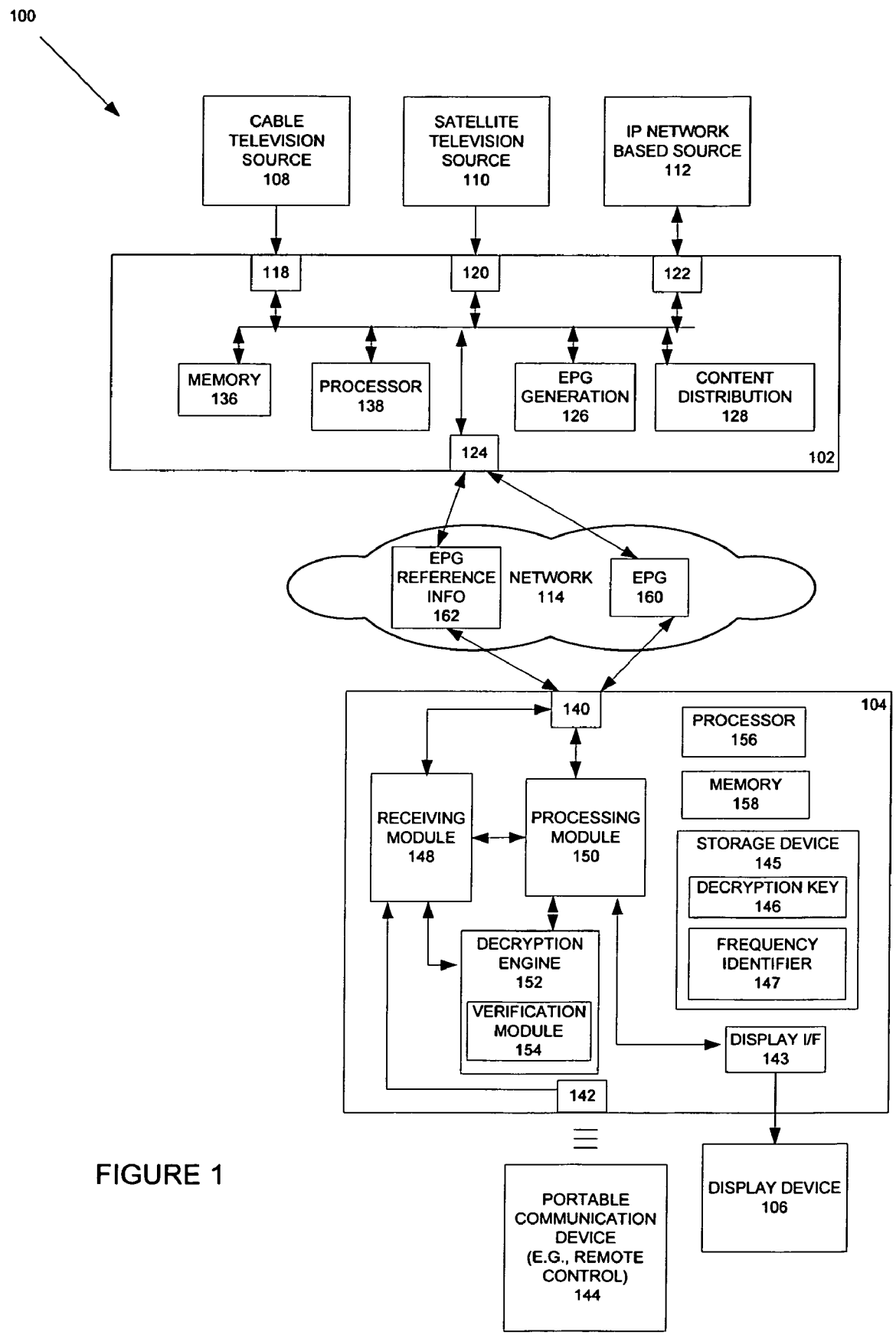
FIG. 1 is a diagrammatic representation of a multimedia distribution system, according to an embodiment of the present disclosure.

Referring to FIG. 1, an example multimedia distribution system 100 is illustrated in accordance with at least one embodiment of the present disclosure. As shown, the system 100 includes a multimedia content provider 102, a set-top box 104, a plurality of multimedia content sources, such as cable television source 108, satellite television source 110, and IP network-based source 112. In the illustrated embodiment, the content provider 102 and the set-top box 104 are connected via a network 114, where the network 114 may include a cable television distribution network, a satellite distribution network, a broadcast television distribution network, a data packet-based computer network (e.g., an Ethernet network), and the like. Likewise, the content sources 108, 110, and 112 may be connected via one or more networks to the content provider 102.

As shown, the content provider 102 may include one or more interfaces 118, 120, and 122 to interface with the content sources 108, 110, and 112, respectively, and an interface 124 to interface with the set-top box 104 via the network 114. The interfaces 118, 120, 122, and 124 may include any of a variety of interfaces, such as a coaxial cable interface, a wireless interface for receiving satellite or broadcast transmissions, or a data packet network interface, such as an Ethernet interface or a router. The content provider 102 may include an EPG generation module 126 and a multimedia content distribution module 128. The modules 126 and 128 may be implemented as software, hardware, firmware, or combinations thereof. To illustrate, the content provider 102 may include a memory 136 (e.g., static random access memory (SRAM)) and one or more processors 138, where the modules 126 and 128 may be implemented in part or in whole as executable instructions stored in the memory 136 and executed by the processor 138 to perform the techniques described herein.

As also shown, the set-top box 104 may include an interface 140 for interfacing with the content provider 102 via the network 114, a control interface 142 to receive commands from a remote control 144 and a display interface 143 to interface with the display device 106. The interface 140 may include any of a variety of appropriate interfaces, such as a coaxial cable interface, a wireless interface to send and receive wireless transmissions, or a data packet-based network interface, such as an Ethernet interface. The control interface 142 may include any of a variety of interfaces, such as an infrared interface, a radio frequency interface, a wireless interface, or any combination thereof.

The set-top box 104 is further shown to include a storage device 145 (e.g., non-volatile memory, universal serial bus key, etc.) for storing files including a decryption key 146 and a frequency identifier 147. The set-top box 104 further may include a receiving module 148, a processing module 150, and a decryption engine 152 that may include a verification module 154. The receiving module 148 may receive an encrypted signal from the remote control 144 via the interface 142 responsive to a user entering a command on the remote control 144. The decryption engine 152 may utilize the decryption key 146 to decrypt the encrypted signal. The verification module 154 may determine whether the encrypted signal has been properly decrypted (e.g., whether the set-top box 104 has the correct decryption key 146). If properly decrypted, the verification module 154 directs the processing module 150 to respond to a command that has been included in the encrypted signal (e.g., change channels, increase volume, etc.). The receiving module 148, processing module 150, and decryption engine 152 may be implemented as hardware, software, firmware, or combinations thereof. To illustrate, the set-top box 104 may include a memory 158 and one or more processors 156, where the modules 148, 150, 154 and the decryption engine 152 may be implemented as executable instructions stored in memory 158 and executed by the processor 156 to implement techniques described herein.

In a particular embodiment, the content provider 102 receives data representative of multimedia channels from each of the different content sources 108, 110, and 112, and provides data representative of at least a subset of the multimedia channels to the set-top box 104 for processing and display at the display device 106 and/or output via an audio device (not shown). Moreover, in a particular embodiment, the content provider 102 provides data representative of an EPG 160 to the set-top box 104 for processing by the processing module 150 and for navigation by a user via the remote control 144. As described herein, the EPG 160, in one embodiment, represents a unified EPG including listings for the multimedia channels provided by two or more content sources that provide multimedia channels to the content provider 102. To illustrate, in a particular embodiment, the EPG 160 represents a navigable program guide or user interface whereby a user, via the remote control 144 or other input device, may direct the processing module 150 to navigate between multimedia channels by selecting an icon or other graphical representation of the desired channel as represented by a graphical display of the EPG 160. The EPG 160 may combine representations of all of the multimedia channels from different content sources in a single list, or different lists for different content sources may be displayed concurrently by the EPG 160. Moreover, multimedia channels may be organized within the EPG 160 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

Encryption/Decryption

Figure 2:
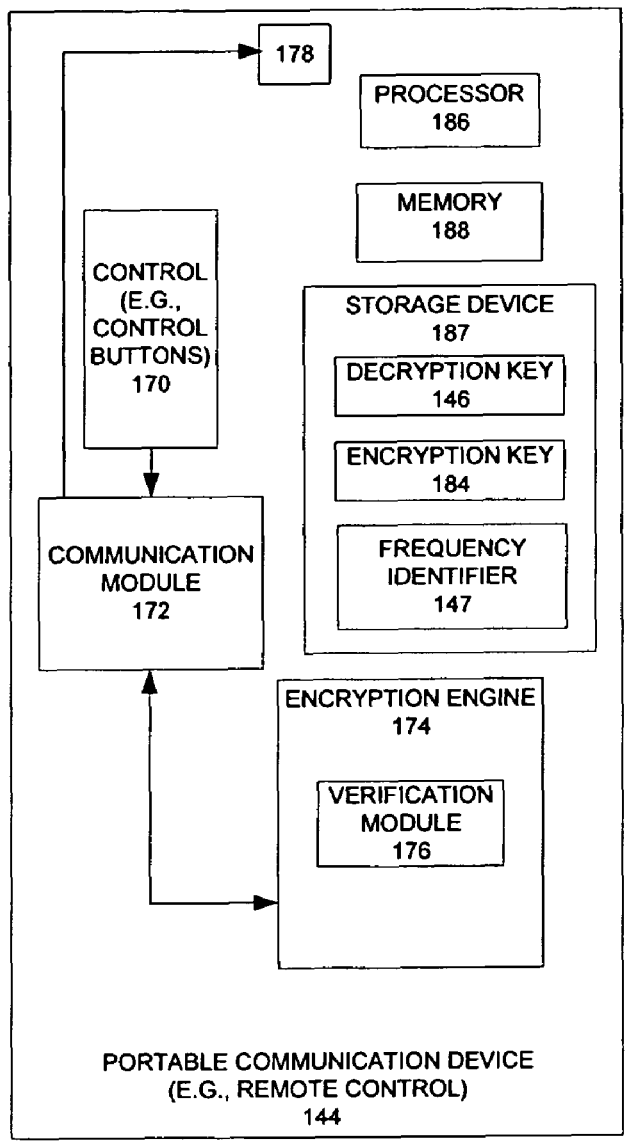
FIG. 2 is a diagrammatic representation of a portable communication device, according to an embodiment of the present disclosure.

Referring to FIG. 1 and FIG. 2, the encryption engine 174 and the decryption engine 152 may use a common routine to encrypt and decrypt data provided that the respective engines 174, 152 use matching keys (e.g., encryption key 184 must match decryption key 146). In one embodiment, the common routine may comply with the data encryption standard (DES). For example the routine may be embodied as a Data Encryption Algorithm (DEA) routine, a Triple DES routine, a G-DES routine, a DES-X routine, a LOK 189 routine, an ICE routine, and the like.

Verification

Referring to FIG. 1 and FIG. 2, the verification module 154 and the verification module 176 may use a common routine to validate command information 192. In one embodiment, the common routine may be embodied as a cyclic redundancy check which may be a hash function. A hash function takes a message of any length as input and produces a fixed length string as output. For example, the cyclic redundancy check routine may receive command information 192 and generate verification information in the form of a checksum. The checksum may be a relatively small number of bits. Examples of cyclic redundancy checks may include CRC-16, CRC-32, and CRC-64. In another embodiment, the common routine may be embodied as a cryptographic hash function (e.g., digital signature) which may also be a hash function with additional security properties. The most commonly used cryptographic hash function may be MD5 and SHA-1.

Radio Frequencies

Most UHF remote controls purchased in the USA operate at a frequency of 433.92 MHz, which was adopted by the European PAL video standard. This frequency may be off-set to the right to avoid a possible interfering carrier generated by a phase alternating line (PAL)/cable television (CATV) system. When the 433.92 MHz frequency is utilized in the US in a National Television System(s) Committee (NTSC)/CATV system, it has the potential of receiving interference from CATV signal leakage from the video carrier at 433.25 MHz. Thus, the signal leakage emanating out of the cable TV plant or drop, may interfere and effectively jam the signal communicated by the remote control 144 to the set-top box 104 giving the appearance that that remote control 144 is malfunctioning or defective.

In one embodiment, the remote control 144 may operate at a frequency that may be selected by a user. For example, a first frequency may operate at the original 433.92 MHz and may be utilized in the European market. A second frequency may operate at 432 MHz and may be utilized in the US market. The 432 MHZ is allocated in the guard band of the US NTSC video channel and provides nearly 2 MHz of separation from a possible CATV 433.25 MHz video carrier. In one embodiment, the remote control 144 may be selected based on selecting a menu that may be displayed on the display device 106.

FIG. 2 is a diagrammatic representation of a portable communication device 144 (e.g., remote control), according to an embodiment of the present disclosure. The remote control 144 is shown to include a control 170 (e.g., control buttons) that may be selected by a user to generate a command, a communication module 172 to receive and process the command, an encryption engine 174 to encrypt the command, the encryption engine 174 including a verification module 176 to generate verification information (e.g., data, verification bits) based on the command. The remote control 144 further includes a control interface 178 that may be utilized by the communication module 172 to communicate an encrypted signal (e.g., including the encrypted command and encrypted verification information) to the set-top box 104. The control interface 142 may include any of a variety of interfaces, such as an infrared interface, a radio frequency interface, a wireless interface, or any combination thereof.

The remote control 144 is further shown to include a storage device 187 (e.g., non-volatile memory, universal serial bus key, etc.) for storing files including the decryption key 146, an encryption key 184, and a frequency identifier 147. In one embodiment, the decryption key 146 and the encryption key 184 may be factory programmed. The encryption key 184 may be utilized by the encryption engine 174 to encrypt command information and verification information. The decryption key 146 may be communicated from the remote control 144 to the set-top box 104 where it may be used by the decryption engine 152 to decrypt the encrypted signal.

The communication module 172, encryption engine 174, and verification module 176 may be implemented as hardware, software, firmware, or combinations thereof. To illustrate, the remote control 144 may include a memory 188 and one or more processors 186, where the modules 172, 176, and encryption engine 174 may be implemented as executable instructions stored in memory 188 and executed by the processor 186 to implement techniques described herein.

Figure 3:
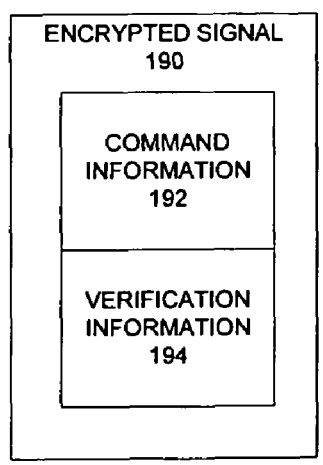
FIG. 3 is a block diagram illustrating an encrypted signal, according to an embodiment of the present disclosure.

FIG. 3 is a block diagram illustrating an encrypted signal 190, according to an embodiment of the present disclosure. The encrypted signal 190 may be communicated from the remote control 144 to the set-top box 104 responsive to a user selecting buttons on the remote control 144 to generate a command. The encrypted signal 190 is shown to include command information 192 that has been encrypted and verification information 194 that has been encrypted. The command information 192 may vary in length (e.g., number of bits) based on the number of keys on the remote control 144. For example, an increase in the number of keys on the remote control 144 may result in an increase in the number of bits in the command information 92. Further, the verification information 194 may vary in length (e.g., number of bits) based on the length of the command information 192 and the selected verification module 176.

Figure 4:
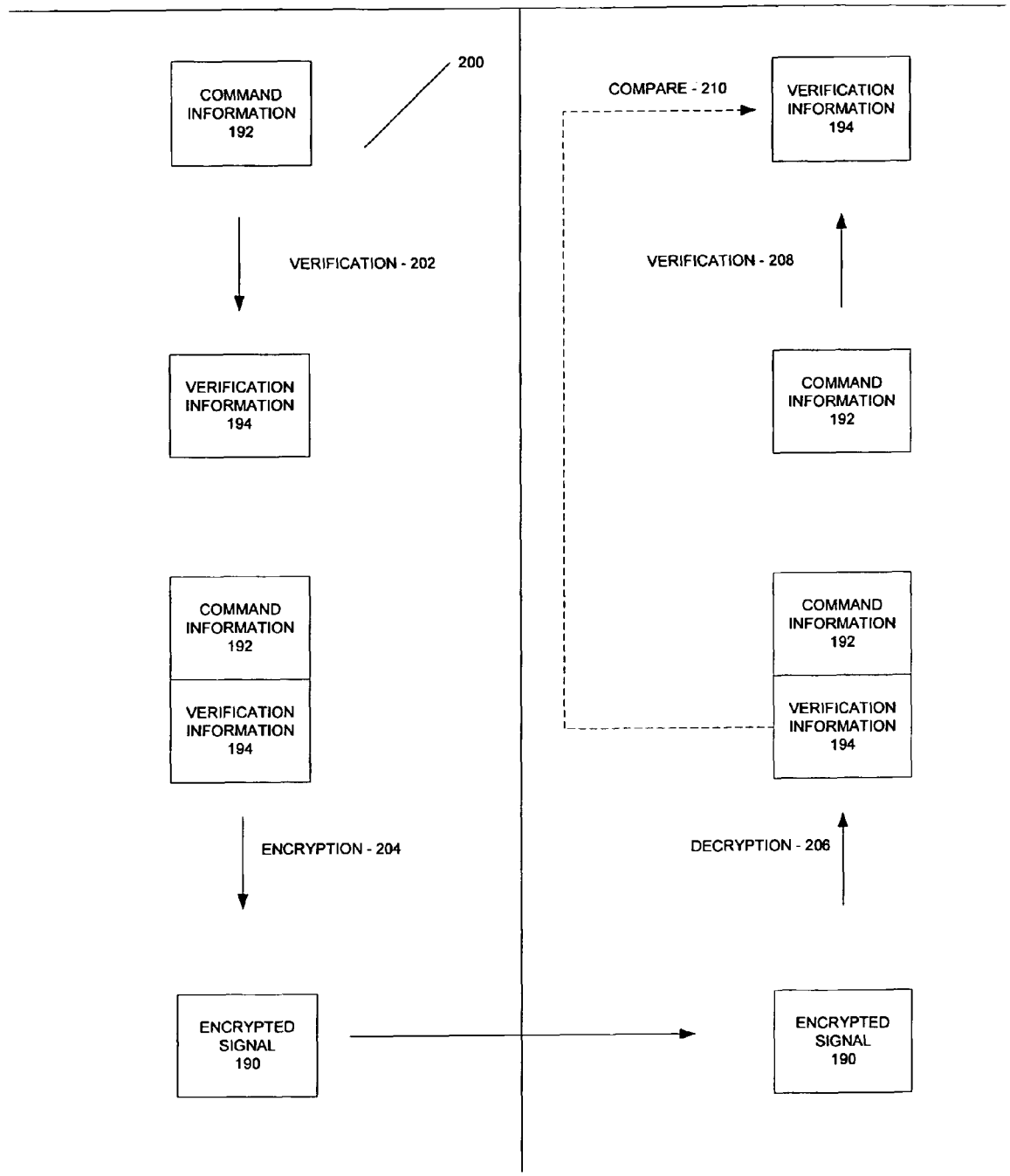
FIG. 4 is a block diagram illustrating data flow in a system, according to an embodiment of the present disclosure.

FIG. 4 is a block diagram illustrating data flow 200, according to an embodiment of the present disclosure. The data flow 200 is presented to provide an overview. Illustrated on the left are operations performed on the remote control 144 and illustrated on the right are operations performed on the set-top box 104. At operation 202 a command is entered by a user (e.g., power on, power off, volume up, volume down, channel up, channel down, etc.) and verified with a verification module 176. For example, the verification module 176 may be embodied as a cyclic redundancy check routine to generate verification information 194 in the form of a 16 bit checksum.

At operation 204, the encryption engine 174, on the remote control 144, encrypts command information 192 and the verification information 194 to generate an encrypted signal 190 that is communicated to the set-top box 104.

At operation 206, the decryption engine 174 on the remote control 144 decrypts the encrypted signal 190 to yield decrypted command information 192 and decrypted verification information 194.

At operation 208, the verification module 154, at the set-top box 104, is utilized to process the command information 192 to generate verification information 194 (e.g., checksum).

Finally, at operation 210, the computed verification information (e.g., checksum) 210 is compared with the decrypted verification information (e.g., checksum) 210. A match indicates that the encrypted signal 190 was decrypted with the correct decryption key 146 triggering the set-top box 104 to execute the command.

FIG. 5 is a flow chart illustrating a method 220, according to an embodiment of the present disclosure, to communicate a decryption key 146 from a remote control 144 to a set-top box 104. Illustrated on the left are operations performed on the remote control 144 and illustrated on the right are operations performed on the set-top box 104. For example, during installation of a set-top box 104, the method 220 may be utilized to distribute the decryption key from the remote control 144 to the set-top box 104.

At operation 222, the user may cause the communication module 172, at the remote control 144, to communicate the decryption key 146 over an infrared (IR) link to the set-top box 104. For example, the user may enter a special key sequence on the remote control 144. The IR link limits communication to line of site thereby minimizing the chance that the decryption key 146 may be received by a set-top box 104 not intended to receive the decryption key 146.

At operation 224, at the set-top box 104, the receiving module 148 receives and stores the decryption key 146 in the storage device 145. Henceforth the set-top box 104 may utilize the decryption key 146 to decrypt the encrypted signal 190. It will be appreciated that the set-top box 104 may be programmed with multiple remote controls 144 causing the set-top box 104 to store multiple decryption keys 146 and enabling the set-top box 104 to respond to commands that may be communicated from any of the multiple remote controls 144.

In another embodiment, the encryption key 184 and the decryption key 146 may be factory programmed to be stored on the storage device 145 on the set-top box 104. In this embodiment the method 220 may be utilized to communicate the decryption key 146 from the receiving module 148, at the set-top box 104, to the communication module 172, at the remote control 144.

FIG. 6 is a flow chart illustrating a method 226, according to an embodiment of the present disclosure, to select a radio frequency. Illustrated on the left are operations performed on the remote control 144 and illustrated on the right are operations performed on the set-top box 104. For example, during installation of a set-top box 104, the method 220 may be utilized to select a radio frequency that may be utilized by the remote control 144 to communicate a signal and by the set-top box 104 to receive the signal. The method 226 commences at operation 228, at the remote control 144, with the communication module 172 receiving a frequency identifier 147 that corresponds to a selection that has been entered by a user who may be operating the remote control 144.

Figure 8:
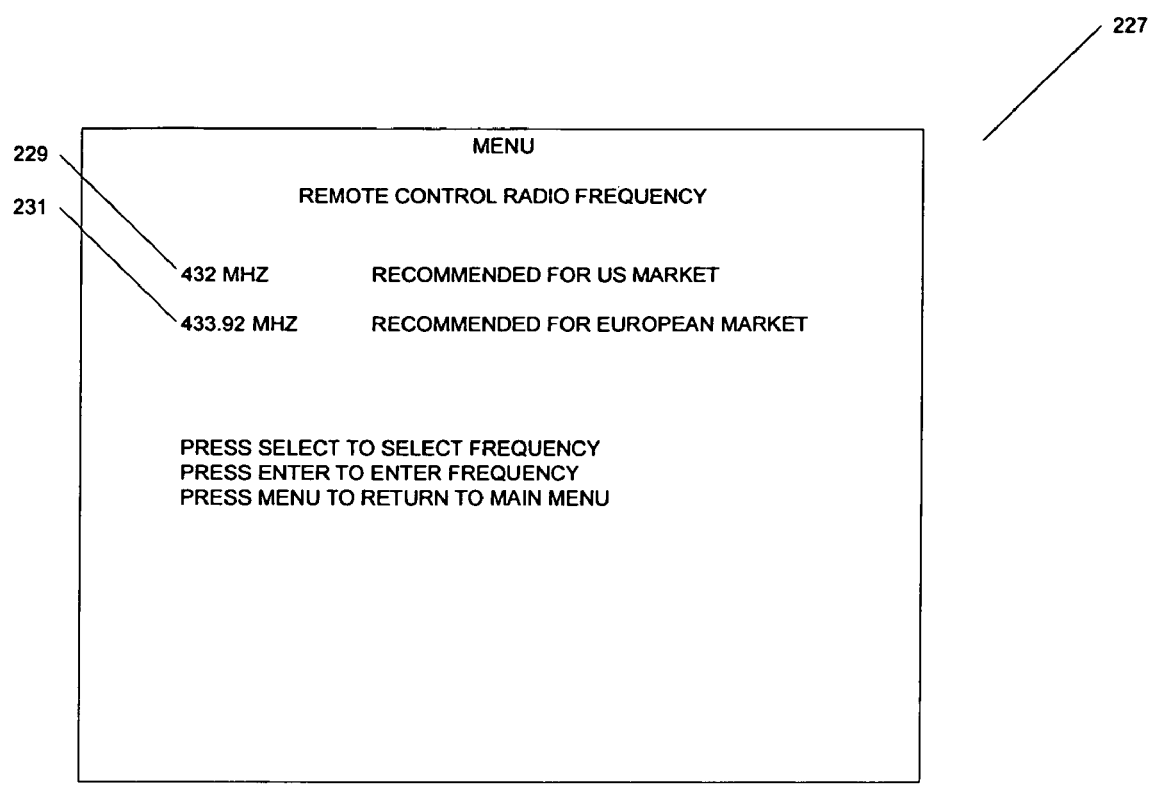
FIG. 8 is a representation of a user interface, according to an embodiment of the present disclosure, to select a frequency.

FIG. 8 is a representation of a user interface 227, according to an embodiment of the present disclosure, to select a frequency. The user interface 227 is shown to include a frequency 229 for the US market operating at 432 MHz and a frequency 231 for the European market operating at 433.92 MHz. Returning to FIG. 6, at operation 228, responsive to receiving the frequency identifier 147, the communication module 172 stores the frequency identifier 147 in the storage device 187 and communicates the frequency identifier 147 over an infrared (IR) link to the set-top box 104.

At operation 230, at the set-top box 104, the receiving module 148 receives the frequency identifier 147 and stores the frequency identifier 147 in the storage device 145. Henceforth, all communications over the radio frequency link are performed at the frequency corresponding to the frequency identifier 147 (e.g., 432 MHz or 433.92 MHz).

Figure 7:
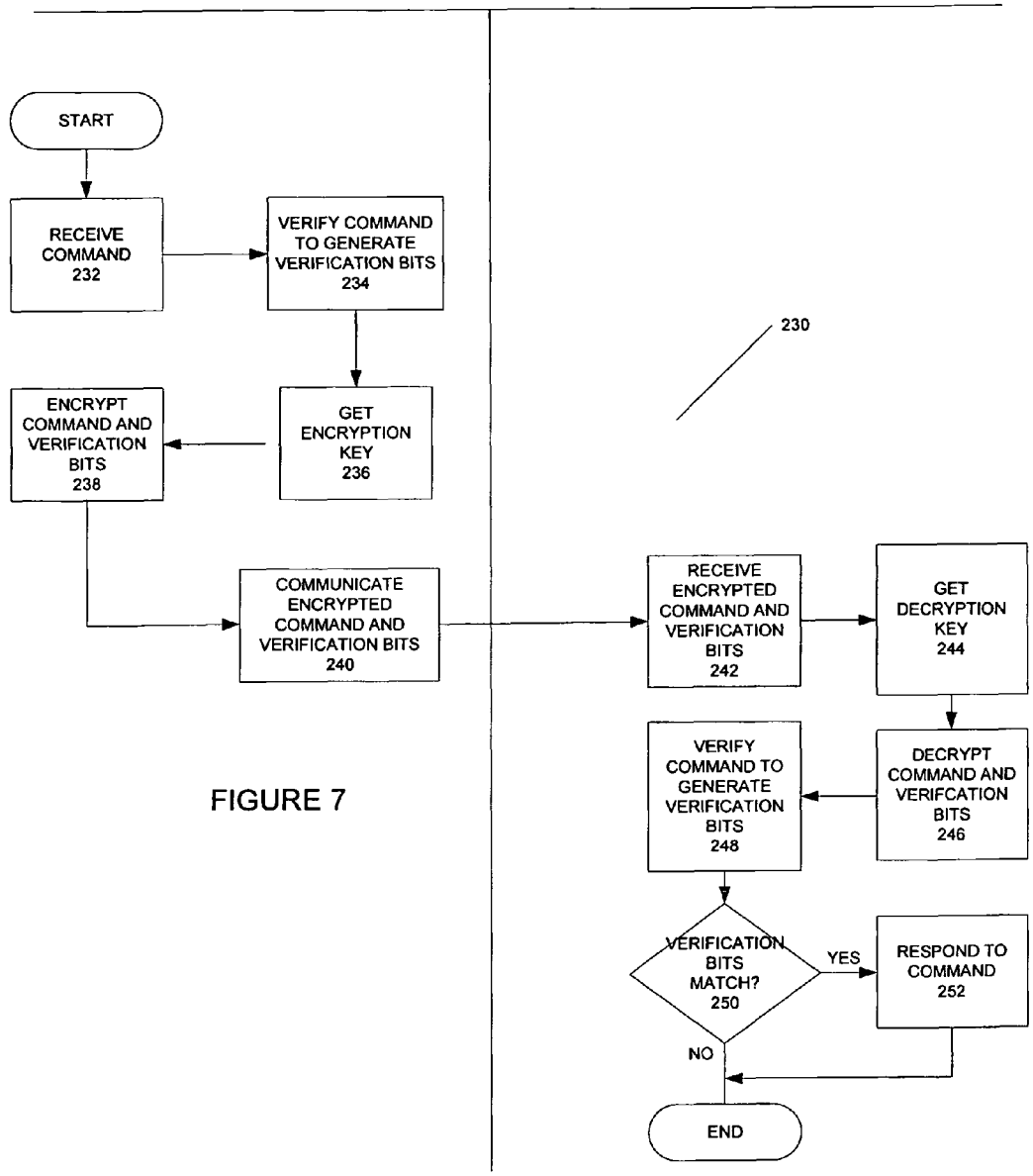
FIG. 7 is a flow chart illustrating a method, according to an embodiment of the present disclosure, to operate a set-top box.

FIG. 7 is a flow chart illustrating a method 230, according to an embodiment of the present disclosure, to operate a set-top box 104. Illustrated on the left are operations performed on the remote control 144 and illustrated on the right are operations performed on the set-top box 104. The method 230, commences at operation 232, at the remote control 144, with the communication module 172 receiving a command from the user. For example, the user may enter a key sequence by using the control buttons 170 on the remote control 144 to generate a command that increments to the next channel.

At operation 234, at the remote control 144, the verification module 176 receives the command information 192 including the command and computes verification information 194. For example, the verification module 176 may utilize a CRC-16 routine to generate verification information 194 that includes data (e.g., verification bits) in the form of a 16 bit checksum.

At operation 236, the encryption engine 174, at the remote control 144, reads the encryption key 184 from the storage device 180.

At operation 238, the encryption engine 174, at the remote control 144, generates an encrypted signal 190. For example, the encryption engine 174 may receive the command information 192 and the verification information 194 from the communication module 172 and generate an encrypted signal 190 that includes encrypted command information 192 and encrypted verification information 194.

At operation 240, the communication module 172, at the remote control 144, communicates the encrypted signal 190 to the set-top box 104. In one embodiment, the encrypted signal may be communicated over a radio frequency signal that operates at 432 MHz (US market). In another embodiment, the encrypted signal may be communicated over a radio frequency signal that operates at 433.92 MHz (e.g., European market).

At operation 242, at the set-top box 104, the receiving module 148 receives the encrypted signal 190 from the remote control 144 at the same frequency as transmitted by the remote control 144 and communicates the encrypted signal 190 to the decryption engine 152.

At operation 244, the decryption engine 152 reads the decryption key 146 from the storage device 145 and, at operation 246, utilizes the decryption key 146 to decrypt the contents of the encrypted signal 190. For example, the decryption engine 152 may decrypt the encrypted command information 182 to generate command information 182 and the encrypted verification information 194 to generate verification information 194.

At operation 248, the verification module 176 verifies the command information 192. In one embodiment, the verification module 176 may utilize a CRC-16 routine that receives the command information 192 as input and generates verification information 194 that includes data (e.g., verification bits) in the form of a 16 bit checksum.

At decision operation 250, at the set-top box 104, the verification module 176 compares the verification information 194 that was generated by the verification module 154, at the set-top box 104, with the verification information 194 that was received via the encrypted signal 190 and decrypted at operation 246. If a match is found, then the encrypted signal has been successfully decrypted and processing continues at operation 252. Otherwise processing ends.

At operation 252, at the set-top box 104, the verification module 154, communicates the command to the processing module 150 to increment the channel.

It will be appreciated that the set-top box 104 may have been programmed with multiple decryption keys 146 (e.g., from multiple remote controls 144). In this instance the set-top box 104 may iterate operations 244-250 until the decryption keys 146 are exhausted or one of the decryption keys 146 may be utilized by the decryption engine 152 to successfully decrypt the encrypted signal 190.

Figure 9:
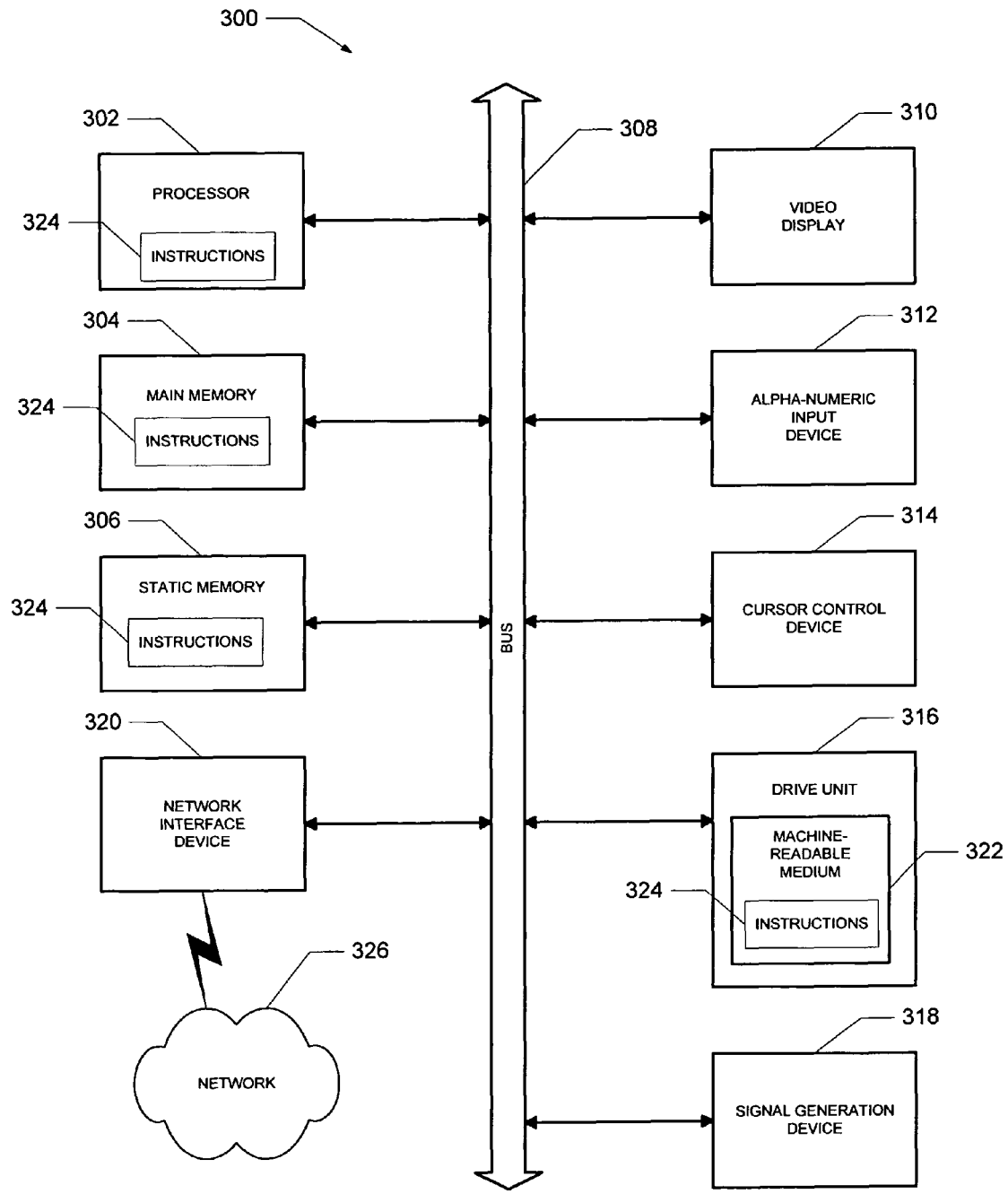
FIG. 9 shows a diagrammatic representation of machine in the example form of a computer system within which a set of instructions; for causing the machine to perform any one or more of the methodologies discussed herein, may be executed, according to an embodiment of the present disclosure.

FIG. 9 shows a diagrammatic representation of machine in the example form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB) 104, a remote control 144, a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, and optical and magnetic media.

Although an embodiment of the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

What is claimed is:

1. A set-top box controlled by a portable communication device serving as a remote controller comprising:
    a receiving module to receive an encrypted signal from the remote controller, the encrypted signal containing information associated with a command; and
    a decryption engine to decrypt the encrypted signal to enable the set-top box to execute the command,
    wherein the set-top box receives the encrypted signal over a radio frequency (RF) signal,
    wherein the receiving module receives an explicit frequency identifier that identifies a first radio frequency from a plurality of radio frequencies corresponding to an explicit market, and
    wherein a user is presented with a user interface and prompted to select either a frequency of 432 MHz for a first market or 433.92 MHz for a second market corresponding to the frequency identifier.

2. The set-top box of claim 1, wherein the encrypted signal includes verification information that includes a first set of data.

3. The set-top box of claim 2, wherein the decryption engine includes a verification module that verifies the information.

4. The set-top box of claim 3, wherein the verification module generates a second set of data, based on the information and compares the second set of data with the first set of data.

5. The set-top box of claim 1, wherein the decryption engine utilizes a decryption key that was communicated from the remote controller to the set-top box over an infra red signal during a set-top box installation set up.

6. The set-top box of claim 1, wherein the decryption engine uses a decryption key that was stored in a storage device.

7. The set-top box of claim 1, wherein the decryption engine includes a verification module to verify the information with a cyclic redundancy check.

8. The set-top box of claim 1, wherein the decryption engine includes a verification module to verify the information with a cryptographic hash function.

9. The set-top box of claim 1, wherein the remote controller is a cell phone.

10. A portable communication device serving as a remote controller for controlling a set-top box comprising:
    a control including control buttons for generating a command input;
    an encryption engine to encrypt information to generate an encrypted signal, the information associated with the command input by a user via the control; and
    a communication module to communicate the encrypted signal to the set-top box, the encrypted signal for decryption at the set-top box to enable execution of the command to operate the set-top box,
    wherein the remote controller communicates with the set-top box using an infrared(IR) signal,
    wherein the communication module receives an explicit user selected frequency identifier that identifies a first radio frequency from a plurality of radio frequencies, and
    wherein a user interface prompts for the explicit user selected frequency identifier selected from identifiers associated with either a frequency of 432 MHz or 433.92 MHz corresponding to the explicit user selected frequency identifier.

11. The portable communication device of claim 10, wherein the encryption engine includes a verifying module to verify the information with a cyclic redundancy check.

12. The portable communication device of claim 10, wherein the encryption engine encrypts verification information is utilized to verify the information.

13. A method to operate a set-top box, the method comprising:
    receiving an encrypted signal from a portable communication device serving as a remote controller, the encrypted signal containing information associated with a command; and
    decrypting the encrypted signal to enable the set-top box to execute the command,
    wherein the set-top box receives the encrypted signal over a radio frequency (RF) signal,
    wherein the receiving module receives an explicit user selected frequency identifier that identifies a first radio frequency from a plurality of radio frequencies, and
    presenting a user with a user interface and prompting the user to select either a frequency of 432 MHz or 433.92 MHz corresponding to the user selected frequency identifier for predefined markets using either 432 MHz or 433.92 MHz.

14. The method of claim 13, wherein the decrypting the encrypted signal includes verifying the information.

15. The method of claim 13, wherein the decrypting the encrypted signal includes generating a second set of data based on the information and comparing the second set of data with the first set of data.

16. The method of claim 13, wherein the decrypting is performed by using a decryption key that was communicated from the remote controller to the set-top box.

17. The method of claim 13, wherein the decrypting is performed by using a decryption key that was communicated from the set-top box to the remote controller.

18. The method of claim 13, wherein the decrypting the encrypted signal includes verifying the information with a cyclic redundancy check.

19. The method of claim 13, wherein the decrypting the encrypted signal includes verifying the information with a cryptographic hash function.

20. A non-transitory machine readable medium storing a set of instructions that, when executed by a machine, cause the machine to:

receive an encrypted signal from a portable communication device serving as a remote controller, the encrypted signal containing information associated with a command; and decrypt the encrypted signal to enable the set-top box to execute the command, wherein the set-top box receives the encrypted signal over a radio frequency (RF) signal, wherein the receiving module receives a user selected frequency identifier that identifies a first radio frequency from a plurality of radio frequencies wherein each frequency among the plurality of frequencies corresponds to a predetermined market, and wherein a user is presented with a user interface and prompted to select either a first explicit frequency or another explicit frequency corresponding to the frequency identifier and the predetermined market.

* * * * *